United States Patent [19]

Annic et al.

[11] Patent Number: 5,690,199
[45] Date of Patent: Nov. 25, 1997

[54] HYDROKINETIC COUPLING APPARATUS, NOTABLY FOR MOTOR VEHICLES

[75] Inventors: Pascal Annic, Dinard; Michel Ginaldi, Paris; Gustave Chasseguet, Tarverny, all of France

[73] Assignee: Valeo, Paris, Cedex, France

[21] Appl. No.: 545,738

[22] PCT Filed: Mar. 3, 1995

[86] PCT No.: PCT/FR95/00257

§ 371 Date: Nov. 6, 1995

§ 102(e) Date: Nov. 6, 1995

[87] PCT Pub. No.: WO95/23930

PCT Pub. Date: Sep. 8, 1995

[30] Foreign Application Priority Data

Mar. 4, 1994 [FR] France ................ 94 02543

[51] Int. Cl.⁶ .................................... F16D 33/00
[52] U.S. Cl. .................. 192/3.29; 192/3.28; 192/214; 464/68
[58] Field of Search .................. 192/3.29, 3.28, 192/3.33, 212, 214; 464/66, 68

[56] References Cited

U.S. PATENT DOCUMENTS

| | | |
|---|---|---|
| 2,920,728 | 1/1960 | Forster ................ 192/3.29 |
| 4,143,561 | 3/1979 | Melbom ................ 192/3.29 X |
| 4,867,290 | 9/1989 | MacDonald et al. ................ 192/3.28 |
| 4,976,656 | 12/1990 | Bacher et al. ................ 464/68 |
| 5,388,678 | 2/1995 | Murata ................ 192/3.29 |

FOREIGN PATENT DOCUMENTS

| | | |
|---|---|---|
| 0577389 | 1/1994 | European Pat. Off. . |
| 2620187 | 3/1989 | France . |
| 4118686 | 12/1992 | Germany . |
| 6-17905 | 1/1994 | Japan ................ 192/3.29 |

*Primary Examiner*—Andrea L. Pitts
*Attorney, Agent, or Firm*—Longacre & White

[57] ABSTRACT

The hydrokinetic coupling apparatus includes a housing (12) capable of being rotatably locked on a driving shaft, a turbine wheel (14) capable of being rotatably locked on a driven shaft and a locking clutch (10) acting between the housing (12) and the turbine wheel (14), the said clutch including a piston (2) mounted so as to be axially mobile with respect to the turbine wheel (14), whilst being rotatably locked to the latter, and a counter-piston (3) associated with the housing (12). The piston (12) is interposed axially between the turbine wheel (14) and a mass (3), forming a counter-piston, pivotally mounted on the housing (12). The said mass (3) is coupled elastically to the said housing (12) by means of springs (7) mounted at the outer periphery of the mass (3) between a transverse wall of the housing (12) and a radial projection (31) on the mass (3).

10 Claims, 5 Drawing Sheets

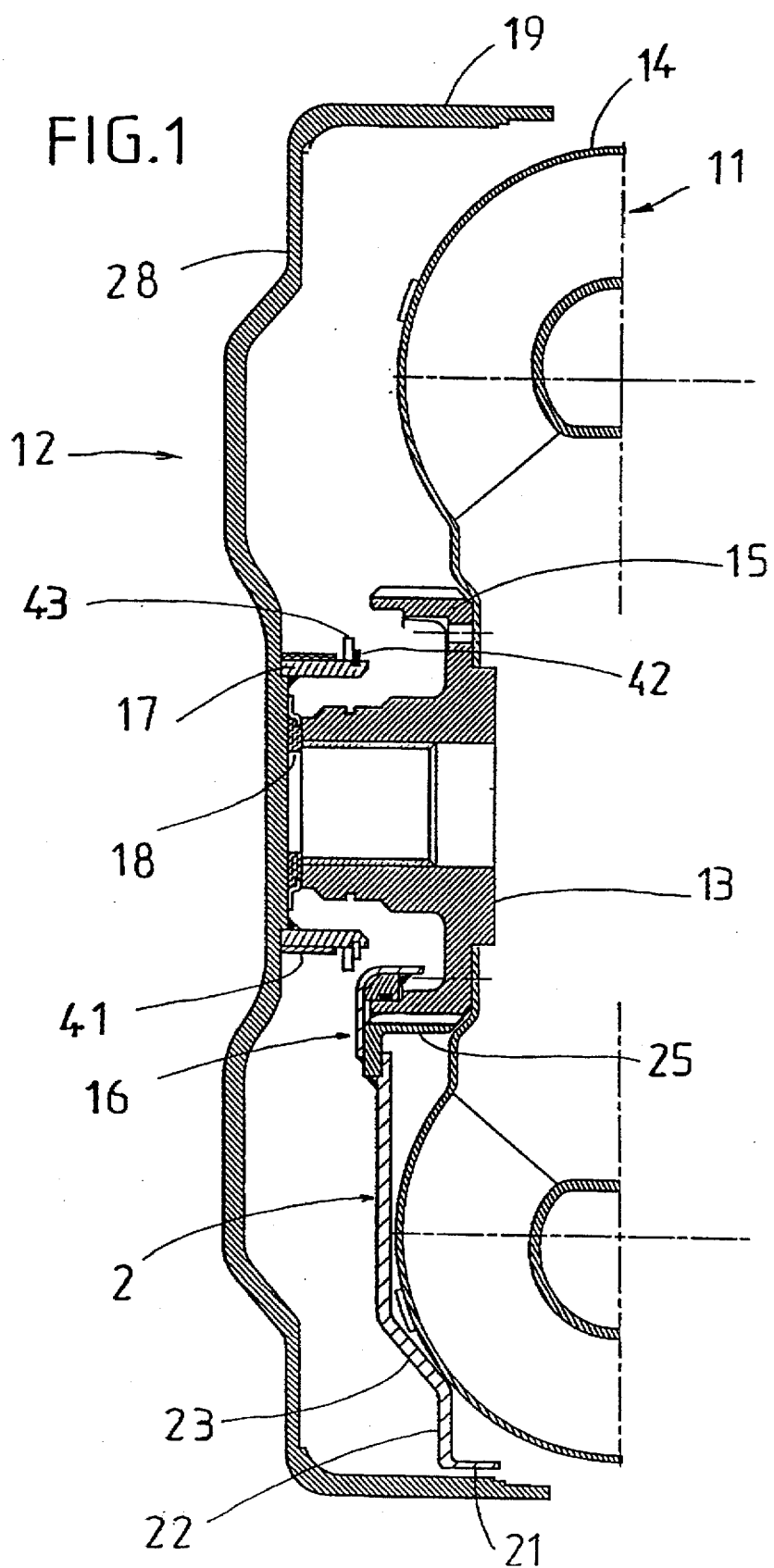

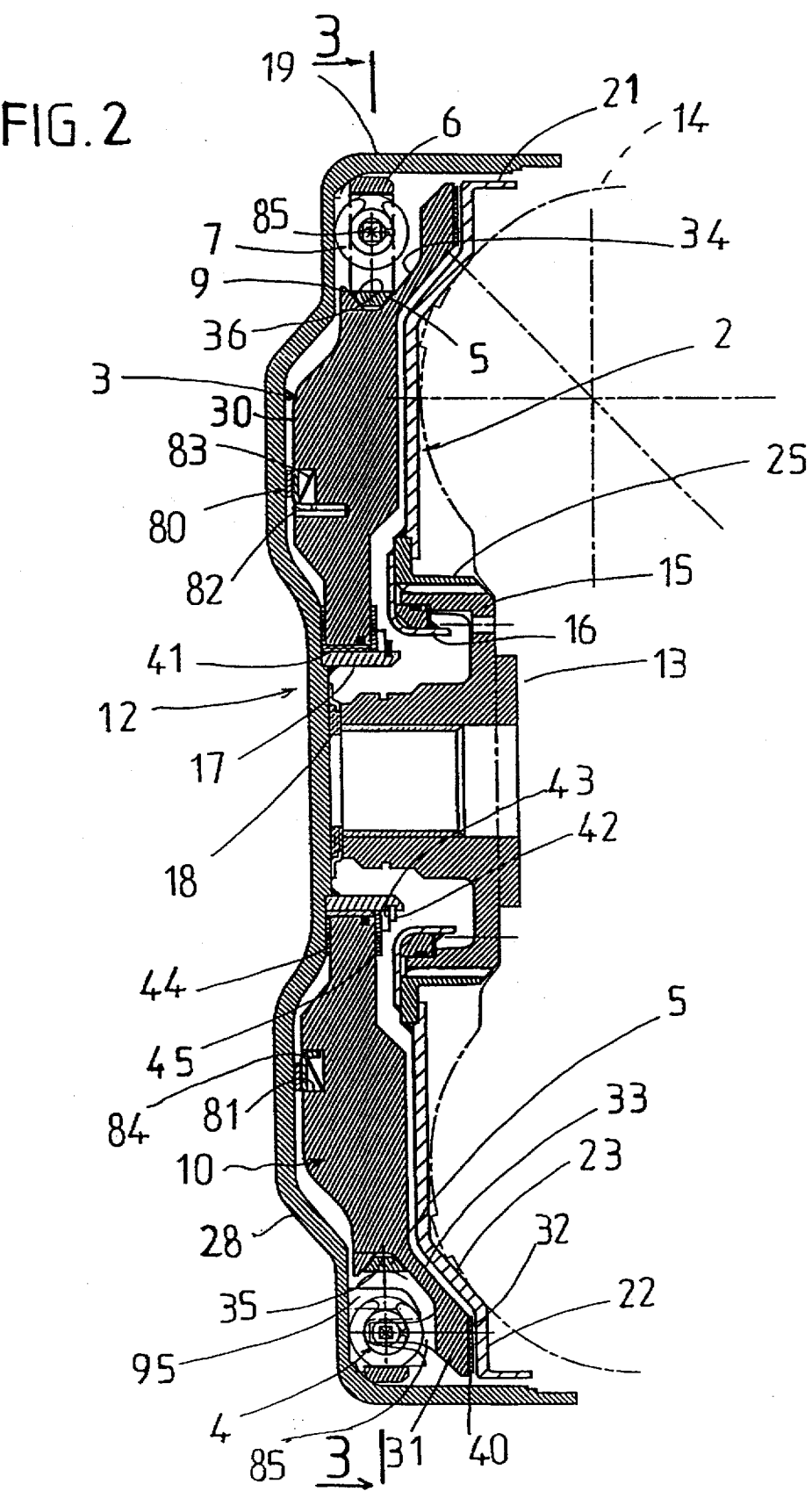

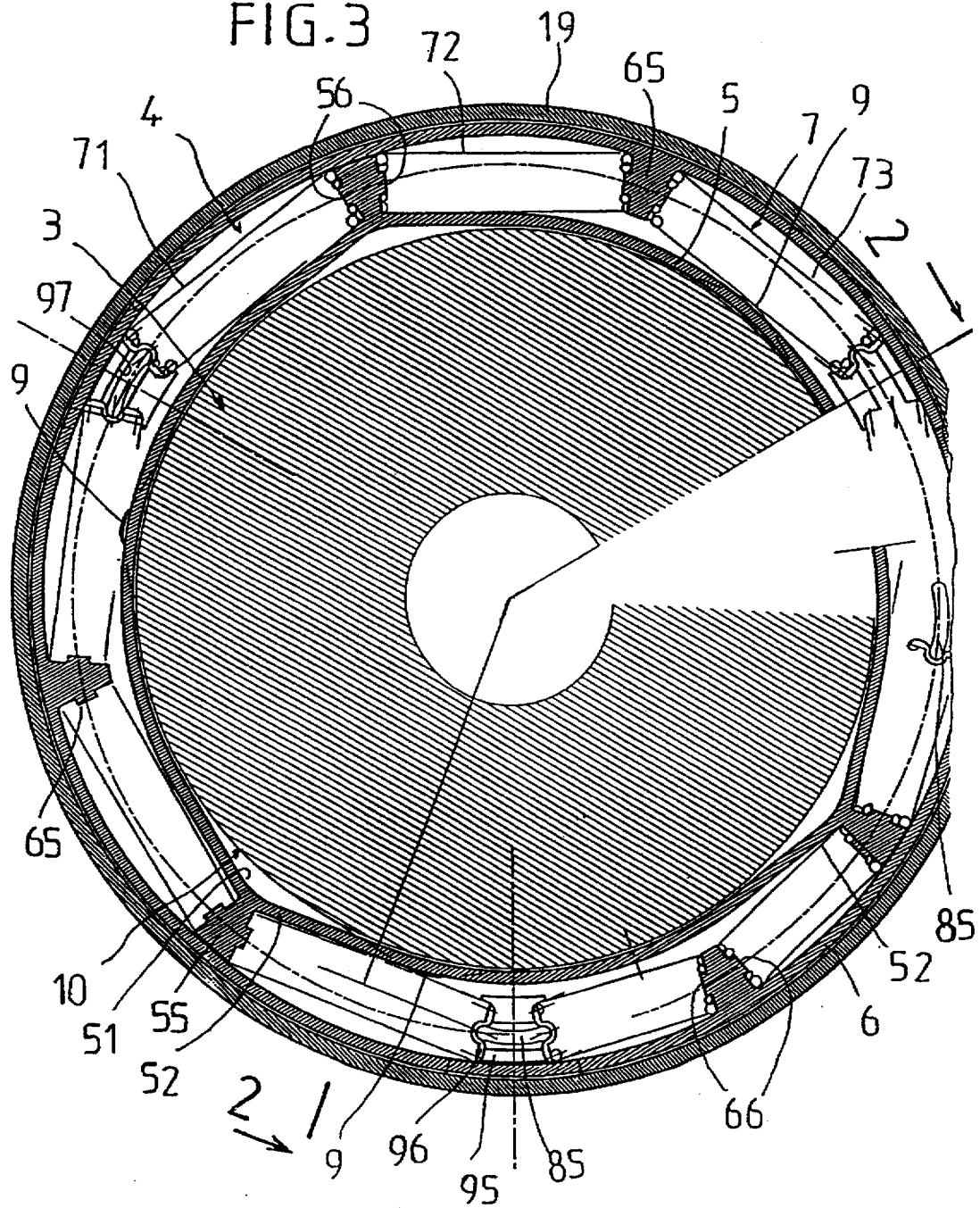

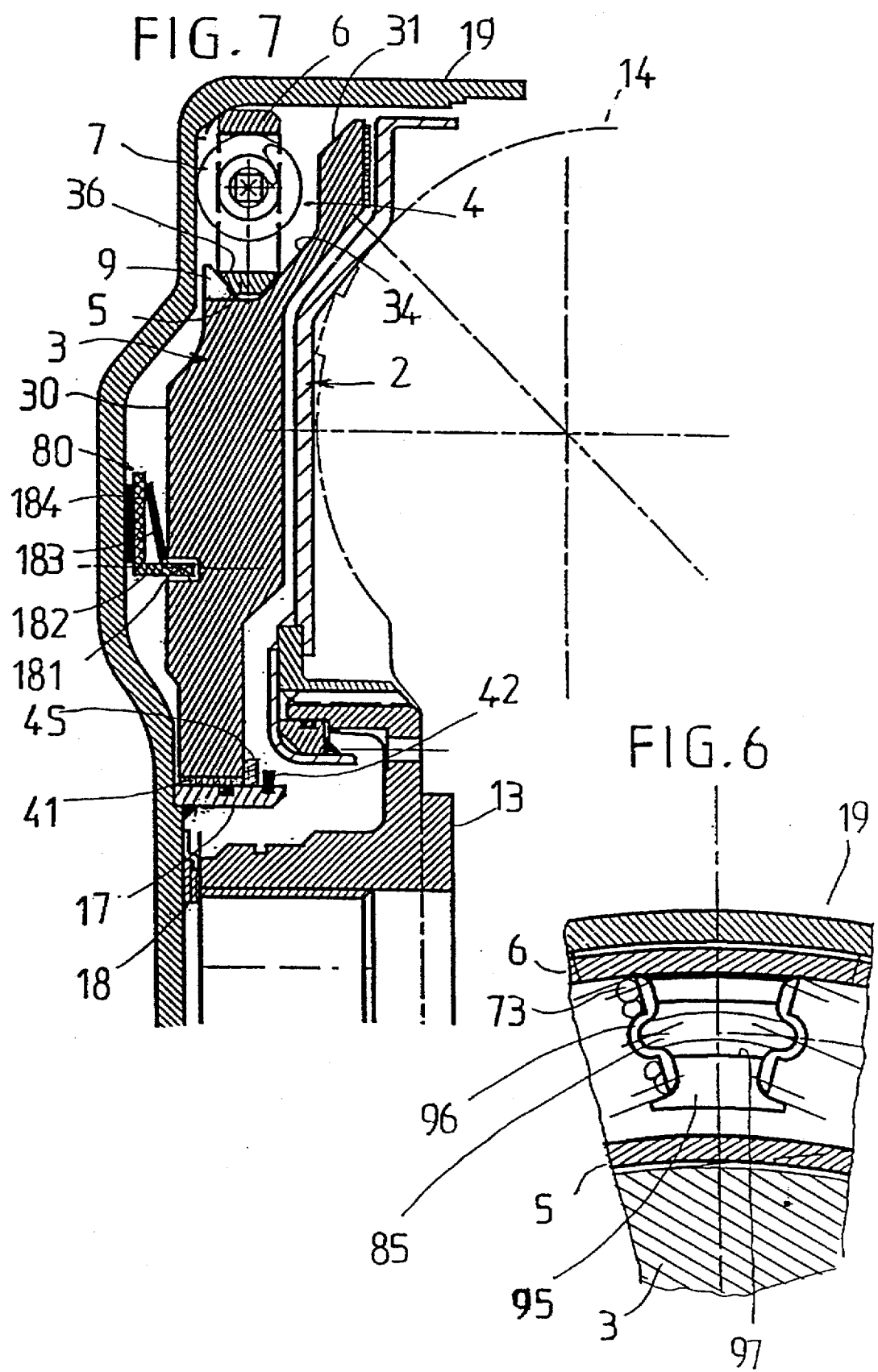

5,690,199

HYDROKINETIC COUPLING APPARATUS, NOTABLY FOR MOTOR VEHICLES

BACKGROUND OF THE INVENTION a) Field of the Invention

The present invention concerns hydrokinetic coupling apparatus, notably for motor vehicles, of the type having a housing capable of being rotatably locked to a driving shaft, a turbine wheel capable of being rotatably locked to a driven shaft and a locking clutch acting between the housing and the turbine wheel, the said clutch having a piston and a counter-piston associated with the housing.

b) Description of Related Art

Such an apparatus is described in the document U.S. Pat. No. 4,976,656.

In this document the piston belongs to a torsion damping device, whilst forming one of the guide washers for the latter.

This device also includes an internally fluted web for its rotatory connection with axial mobility with respect to a turbine hub integral with the turbine wheel.

Thus the piston is rotatably connected with axial mobility with respect to the turbine wheel.

More precisely, this turbine hub is capable of being rotatably locked to the input shaft of the gearbox.

Thus the housing forms the driving element of the hydrokinetic coupling apparatus and the turbine hub the driven element of the apparatus.

When the locking clutch is disengaged, the piston is not in contact with the counter-piston formed here by the housing. In this position the turbine wheel is driven by the impeller wheel by virtue of the circulation of the fluid contained in the housing.

Thus in this position the inertia of the locking clutch makes its effects felt, since the clutch is carried to a major extent by the turbine hub.

As a result this inertia makes its effects felt on the input shaft of the gearbox and therefore on the gear wheels in the latter.

In addition the hydrokinetic coupling apparatus is mounted in the kinematic chain extending from the internal combustion engine of the motor vehicle to the gearbox.

This system therefore has a resonant frequency which makes its effect felt at the normal running speed of the vehicle within the operating speed range of the thermal engine.

In the document EP-A-0 577 389, the piston is interposed axially between the turbine wheel and a mass, forming the counter-piston, pivotally mounted on the housing, and in that the mass is elastically coupled to the housing.

By virtue of this arrangement, when the clutch is disengaged the inertia due to the locking clutch is determined mainly by the piston and is therefore very low, so that the gear wheels in the gearbox are lightly stressed.

In addition, the response time for engaging and disengaging the clutch are reduced.

When the locking clutch is engaged, the mass makes its effects felt and the inertia increases so that the resonant frequency of the system in which the hydrokinetic coupling apparatus is mounted is reduced.

In this document EP-A-0 577 389, the mass includes a main element and a hollow cover for mounting springs forming elastic means with circumferential action forming part of a torsion damping device. The housing constitutes the input element of the torsion damping device, whilst the mass constitutes the output element of the device.

To this end, a plate rotatably fixed to the casing enters between the main element and the cover connected by riveting. This plate has recesses for the elastic means.

As a result the mass and the torsion damping device have a relatively complicated shape and the mass is lightened by the presence of the torsion damping device.

In addition, the main element is mounted at its inner periphery pivotally on a tubular nose carried so as to be fixed centrally on the housing. This element is also mounted pivotally on an annular projection on the housing.

This arrangement also complicates the shape of the mass is of such a nature as to perturb the rotation of the mass.

SUMMARY OF THE INVENTION

The object of the present invention is to mitigate these drawbacks in a simple and economical manner, whilst preserving the advantages of a large relative angular movement between the mass and the housing.

The object of the present invention is therefore to simplify the mass, whilst increasing its weight and assisting its rotation without loosing the advantage of a large relative angular movement between the mass and the housing.

According to the invention a coupling apparatus of the type indicated above is characterized in that a bearing is interposed radially between the internal periphery of the mass and the external periphery of the nose, in that the mass has a main part and at the external periphery of its main part a transversely oriented annular projection directed radially in the direction of the annular edge of the housing whilst being offset axially with respect to the main part of the mass in the direction of the external periphery of the turbine wheel, in that the projection offers a contact surface for the piston and in that the elastic means with circumferential action of the torsion damping device are mounted at the external periphery of the main part of the mass between the transverse projection of the mass and the transverse part of the housing.

By virtue of the invention the main part of the mass is of a single piece and the elastic means are located on a large-diameter circumference, which makes it possible to obtain a large relative angular movement between the mass and the housing, the movement being assisted by the presence of the bearing.

In addition, the increase in inertia is favourable to a reduction in the resonant frequency.

Thus, at the normal operating speed of the vehicle, the phenomena of resonance do not exist within the operating range of the thermal engine.

According to one characteristic the projection carries fingers, directed axially towards the housing, and the housing carries bearing lugs directed axially towards the projection.

The fingers and lugs serve respectively for the actuation and support of the springs of the elastic means.

By virtue of this arrangement the torsion damping device is simplified.

According to one characteristic the fingers each enter a notch in the bearing lugs.

Thus the springs of the elastic means bear directly or indirectly by means of dishes on the lugs, except at the level of the notches in the latter so that the springs have a good seating and are in engagement centrally with the fingers. In this way a symmetrical engagement of the springs is obtained, for example long pre-arched curved springs in order to obtain a large relative angular movement between the housing and the mass.

All this simplifies the torsion damping device. As a variant, a large relative angular movement is obtained between the housing and the mass by means of phasing washers.

Advantageously the projection on the mass is connected to the main part of the mass by an inclined part.

By virtue of this arrangement the free space between the turbine wheel and the housing is occupied optimally and advantage can be taken of this to lock a phasing washer axially.

BRIEF DESCRIPTION OF THE DRAWINGS

The following description illustrates the invention with regard to the accompanying drawings, in which:

FIG. 1 is a view in axial section of the hydrokinetic coupling apparatus without the locking clutch in the top part of this figure and with only the piston of the locking clutch in the bottom part of this figure;

FIG. 2 is a view in axial section along the line 2—2 in FIG. 3 of the hydrokinetic apparatus with its locking clutch;

FIG. 3 is a view in section along the line 3—3 in FIG. 2;

FIG. 6 is a partial view to a larger scale of part of FIG. 3;

FIG. 7 is a half-view in axial section similar to FIG. 2 for another example embodiment.

DETAILED DESCRIPTION OF PREFERRED EMBODIMENT

Figure 5:
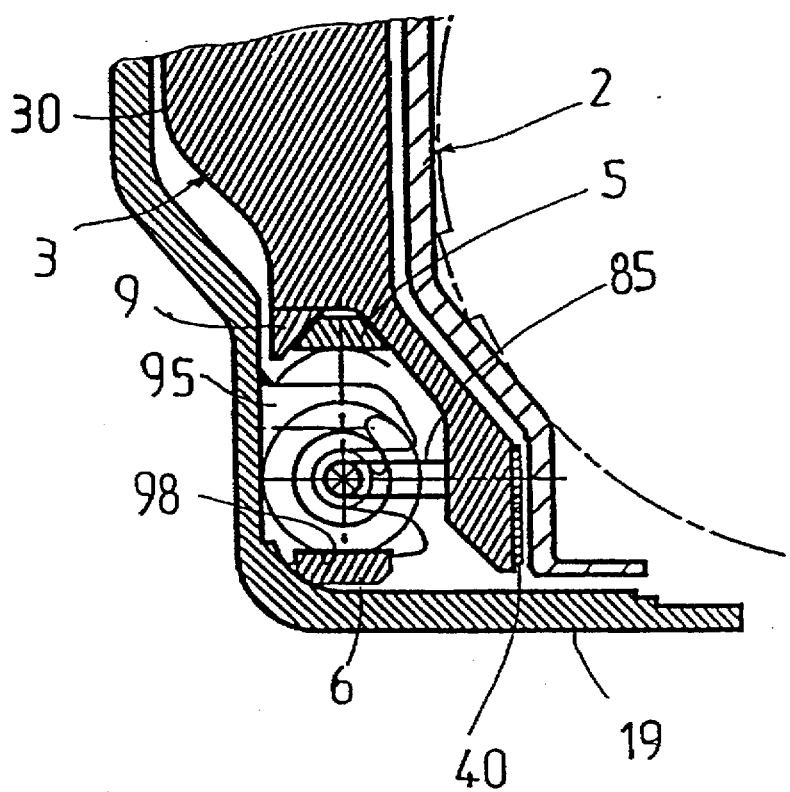
FIG. 5 is a view similar to FIG. 4 for a variant embodiment.

As illustrated by the figures, the locking clutch 10, using a torsion damping device 4 with elastic means with circumferential action 7, is intended for equipping a hydrokinetic coupling apparatus 11, including a torque converter or a coupling, which is itself intended for equipping a motor vehicle.

Such an apparatus is described in the patent U.S. Pat. No. 4,976,656, to which reference can be made, and this is the reason why, for the sake of simplicity, only the first part of the housing 12 and turbine wheel 14 has been depicted in FIG. 1, the impeller wheel and the reactor wheel not being visible.

For information, it should be stated that this apparatus 11 includes, in a sealed housing 12 capable of being rotatably connected to the crankshaft of the internal combustion engine, at least one impeller wheel fixed to the other part of the housing, in the form of a half-shell, and a turbine wheel 14, which is capable of being rotatably connected to the gearbox input shaft. In this case the apparatus 11 includes, in order to form a torque converter, also a reactor wheel carried by a fixed sleeve surrounding the said input shaft with the interposition of a free wheel.

The locking clutch 10 acts axially between the turbine wheel 14 and housing 12, annular in shape, at the outer periphery of the latter.

It includes a piston 2 capable of coming into contact with a counter-piston 3 in order to establish a direct connection between the turbine wheel 14 and housing 12.

In a manner known per se, the turbine wheel and impeller wheel include blades so that the turbine wheel 14 is rotated by the impeller wheel fixed to the housing 12 by means of the circulation of the oil contained in the housing 12.

The locking clutch 10 acts in a manner known per se after the start-up of the motor vehicle in order to avoid slip phenomena and losses of energy.

The turbine wheel 14 is fixed, in this case by welding or as a variant by riveting, to a turbine hub 13 fluted internally for rotary connection with the aforesaid input shaft of the gearbox.

This hub 13, in this case metallic, has at its outer periphery an externally fluted annulus 15 of axial orientation.

The piston 2 is in this case fixed by welding, or as a variant by riveting, to an internally fluted bush 25 in order to come into an engagement in a complementary manner with the flutes on the annulus 15.

Thus the housing 12 forms the driving element and the hub 13 the driven element of the hydrokinetic coupling apparatus 11.

The housing 12 is therefore capable of being rotatably locked on the driving shaft (the drive shaft of the vehicle), whilst the turbine wheel 14 is capable of being rotatably locked on a driven shaft (the gearbox input shaft).

The housing 12 also forms the input element of the locking clutch 10 and of the torsion damper 4, whilst the piston 2 forms the output element of the locking clutch 10 whilst being capable of being coupled to the hub 13.

The piston 2, of transverse orientation overall, is thus, as described previously, rotatably connected to the turbine wheel 14 (in this case via the hub 13), whilst being mounted so as to be axially mobile vis-a-vis the turbine wheel 14.

A sealing device 16 is located between the front face of the bush 25 and the internal bore of the annulus 15. This device includes an annular part with an L-shaped cross section welded on the one hand to the transverse plate, which the bush 25 has at its axial end furthest from the wheel 14 for fixing the piston 2 by welding, and on the other hand to a ring interposed between the internal periphery of the annulus 15 and the outer periphery of the tubular axial part of the aforementioned annular piece. A sealing joint is provided between the ring and the annulus 15.

In addition the housing 12 carries centrally a nose 17, tubular in shape, forming a centring ring. This nose 17, of axial orientation, is directed towards the turbine wheel 14. It is attached by fixing to the housing 12, in this case by welding, for example by welding of the laser type, with the formation of a bead.

More precisely the nose 17 is attached centrally to the wall 28, transverse overall, which the housing 12 has at its front.

The nose 17 surrounds the front end of the hub 13 and a thrust ring 18 interposed axially between the free end of the hub 13 and the housing. This ring 18, in this case made of friction material, has, in a manner known per se, transverse channels (not visible) for establishing communication between the inside and outside of the hub 13.

For information, it should be stated that the input shaft of the gearbox is hollowed out internally so that the fluid, in this case oil, can circulate through the ring 18 in order to operate the piston 2.

This ring 18 has a retaining insert fixed to the housing, in this case by spot welding.

According to one characteristic the piston 2 is interposed axially between the turbine wheel 14 and a mass 3 pivotally mounted on the nose 17.

The mass 3 carries at its outer periphery an annular projection 31 of transverse orientation offering a contact surface 32 for the piston 2 opposite a transversely oriented counter-surface 22 of the piston 2.

In this case, when the clutch 10 is engaged, the piston 2 bears indirectly through its counter-surface 22 on the surface 32, a friction lining 40 being interposed axially between the surface 32 and the piston 2. This lining 40 is, in this case, bonded to the surface 32, but the converse is possible, since the lining 40 can be bonded to the piston 2 provided at its outer periphery with an axially oriented annular shoulder 21 in order to stiffen it.

It is between the inner periphery of the axially oriented annular rim or skirt 19 which the housing 12 has at its outer periphery, and the outer periphery of the turbine wheel 14, that the surface 32 is located. To this end, the projection 31 is connected by an inclined part 33 to the main part of the mass 3 forming the counter-piston of the clutch 10.

Likewise an inclined part connects the counter-surface 22 of the piston 2, in this case made from pressed sheet metal, to the transversely oriented main part thereof.

The surface 32 and counter-surface 22 are therefore axially offset in the direction of the outer periphery of the turbine wheel 14, in this case by means of the inclined parts 23, 33 making it possible to fit the shape of the wheel 14 optimally and therefore to reduce the axial dimension.

Thus the mass 3 has a main part 30 and, according to one characteristic, at the outer periphery of its main part 30, the projection 31 directed radially in the direction of the shoulder 19 on the casing 12, being axially offset with respect to the main part 30 in the direction of the outer periphery of the turbine wheel 14. The main part 30 is therefore of a single piece.

According to one characteristic the inclined part 33 offers a bearing surface for a phasing washer 5 with a cross section of trapezoidal shape overall.

More precisely it is the face 34 turned in the opposite direction to the piston 2 and the wheel 14 of the inclined part 33, tapered in shape, which forms the said bearing surface. This face 34 is connected to the axially oriented annular face 35, which the main part 30 of the mass 3 has at its outer periphery.

The mass 3 has radial projections 9 from place to place. In this case three projections 9 are provided. These projections 9 have, in transverse section (FIG. 2), a wedge shape and offer an inclined bearing face 36 opposite the face 34.

The face 36 is inclined in the opposite direction with respect to the face 34.

The projections 36 extend at the level of the free end of the face 35 so that a trapezoid-shaped groove with two inclined faces 36, 34 and a bottom 35 is formed locally.

The distance between the inclined faces 34, 36 is determined by the width of the phasing washer 5 so that the latter can be housed in the divided groove and come to bear, with assembly tolerance, on the faces 36, 34. An annular radial clearance exists between the external face 35 of the mass 3 and the washer 5.

Thus the washer 5, referred to for convenience as the inner phasing washer, is locked axially and radially by the faces 36, 34 and the mass 3 thus forms a pulley for the washer 5.

In order to be able to mount the washer 5 in the grooves in the mass 3, according to one characteristic, the washer 5 has locally passages 51 into which the projections 9 are able to enter. Circumferentially these projections 9 have in this case a triangular shape overall (FIG. 3) and the same applies to the passages 51 formed therefore by means of a projecting deformation 52 in the direction opposite to the axis of the assembly, the deformation 52 being triangular in shape.

Thus the mounting of the washer 5 in the grooves is of the bayonet type with, initially, axial engagement of the deformations 52 over the projections 9 and then rotation with engagement of the washer 5 in the grooves and axial locking thereof.

The mass 3 is elastically coupled to the housing 12, in this case by the torsion damping device 4 acting at the outer periphery of the mass 3. More precisely this device acts according to a characteristic of the invention, on the one hand radially between the inner periphery of the outer shoulder 19 of the housing 12 and the external face 35 of the main part 30 of the mass 3 and, on the other hand, axially between the transverse part 28 of the housing 12, in this case made from pressed sheet metal, and the projection 31 on the mass 3, in this case made of steel or, as a variant, cast iron.

The elastic means 7 of the device 4 are therefore mounted radially between the face 35 and the rim 19 and axially between the part 28 and the projection 31. The location of these means 7 promotes an increase in the relative angular movement between the mass 3 and housing 12.

This device has another phasing washer 6, referred to as the outer phasing washer, in this case pivotally mounted on the outer periphery of the first phasing washer 5. Thus the phasing washers 5, 6 are mounted rotatably with respect to the coaxial parts 3, 12.

In this case these washers 5, 6 are metallic, being produced by cutting out on a press. These phasing washers 5, 6 are mounted in the same plane, in reverse orientations and concentrically, the material of the inner washer 5 being taken economically from the waste material of the outer washer 6 surrounding the washer 5.

These washers 5, 6 are in the image of each other and each have radial lugs respectively 55, 65, each with fingers respectively 56, 66 extending circumferentially on each side of the lugs 55, 65 for centring of the circumferential-action elastic means 7 described below.

The lugs 55 on the washer 5 are directed radially in the direction opposite to the axis of the assembly, whilst the lugs 65 on the washer 6 are directed towards the axis of the assembly.

These lugs 55, 65 have an overall trapezoidal shape, the free end of the lugs 65 extending at a distance from the washer 5, whilst the top edge, with a greater circumferential width, of the lugs 55 serves, according to one characteristic, for centring the outer washer 6.

This washer 6 is thus pivotally mounted on the outer periphery of the lugs 55.

Naturally the height of the lugs 65 is such that it does not interfere with the deformations 52, and the number of lugs 55, 65 depends on the applications.

In this case three lugs 55, 65 are provided. The lugs 55 are distributed evenly at 120° with respect to each other and extend from the top of the deformations 52.

The lugs 65 are also distributed evenly at 120° with respect to each other.

The housing 12 carries from place to place axially oriented bearing lugs 95, whilst the mass 3 carries axially oriented fingers 85, circumferentially oblong in shape. The fingers 85 are directed axially towards the wall 28 of the housing 12, whilst the lugs 95 are directed axially towards the projection 31.

Three lugs 95 distributed evenly at 120° with respect to each other and three fingers 85 also distributed at 120° with respect to each other are provided.

Figure 4:
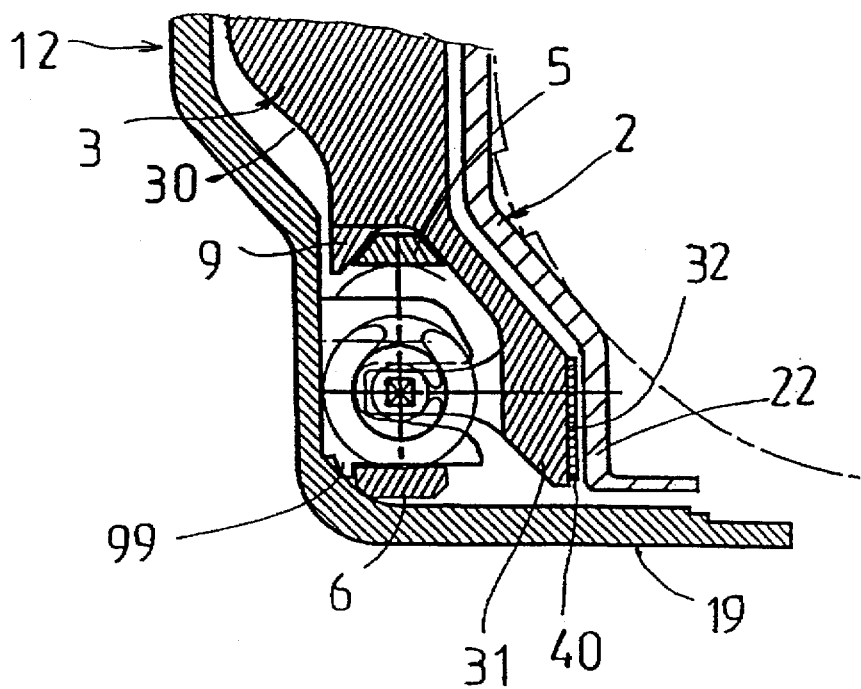
FIG. 4 is a view, to an enlarged scale, of the bottom part of FIG. 2.

The fingers 85 cast in one piece with the mass 3 (with the projection 31 on the latter) extend axially and the same applies to the lugs 95 attached by welding to the housing 12 (on the transverse wall 28 thereof). These lugs offer transversely a large bearing surface (FIGS. 4 and 5).

In the idle state of the torsion damping device the fingers 85 enter a circumferential cutout 97 (FIGS. 4 and 6), which the bearing lugs 95 have centrally.

As can be seen in FIG. 3, in the idle state of the torsion damper between two consecutive lugs 95 there are found successively a lug 65 and then a lug 55, the circumferential offset between two consecutive lugs 55, 65, 95 being 40° overall.

In this position, the projections 9 are in a median position with respect to the lug 55 (FIG. 3), so that the washer 5 is not able to escape since this angle is greater than the relative angular movement between the washer 5 and the mass 3.

Thus the lugs 65 on the outer washer 6 are offset circumferentially with respect to the lugs 55 on the inner washer 5, and in this case three sets of two concentric elastic members 73, 72, 71 are provided, acting circumferentially between two consecutive lugs 95, being mounted radially between the two washers 5, 6.

These elastic members belong to the aforesaid circumferential-action elastic means 7 and in this case consist of concentric helical springs of the same stiffness.

By virtue of the formation of the lugs 95 and fingers 85, it is possible thus to have three groups of three sets of elastic members acting in parallel, the three sets of elastic members acting in series between two consecutive bearing lugs 95. The lugs 95 therefore serve as a support for the ends of the springs 73, offering a good seating for these, whilst the fingers 85 serve to actuate (to compress) the springs 73, by acting centrally on these.

According to another characteristic, the last of the elastic members 73 bears on the lugs 95 through a support dish 96, in this case metallic (FIG. 6).

This dish 96 is curved centrally, in this case in a semicircular fashion, in order to cooperate with one of the circumferential ends of the fingers 85, the end being rounded for this purpose in order to enter the curved part of the dish 96.

In the idle position of the damper 4, the fingers 85 bear on the dishes 96 (FIG. 6).

Naturally a circumferential clearance may exist since, in the aforementioned idle position, the dishes 96 are in abutment on the lateral edges of the lugs 95 (FIG. 6).

Thus the fingers 85, arched in shape (FIG. 6), are mounted telescopically inside the lugs 95 by virtue of the hollowed-out passages 97 therein.

Thus, when there is a relative movement between the mass 3 and housing 12, the fingers 85 are allowed to act on the dishes 96 in question and to compress the elastic members 73, which bear on the lugs 65 which then move, causing a compression of the members 72 bearing on the lugs 55, which move in order compress the springs 71 bearing on the lugs 95.

By virtue of this arrangement it is possible to obtain large angular movements between the fingers 85 and lugs 95 and therefore between the housing 12 and mass 3. In this case all the members 71, 72, 73 have the same stiffness but this is not necessarily the case, for example the members 72 may have a greater stiffness than the members 73, which may have a greater stiffness than the members 71, chosen for example to filter the vibrations in the idling range of the vehicle engine.

It is possible thus to obtain a torsion damping device with multiple gradients and variable stiffness.

Naturally this depends on the applications and notably on the torque to be transmitted.

It will be noted that the inner periphery of the lugs 95 is profiled so as to hold the dishes 96 (FIG. 6). Thus the inner edge of the lugs 95 is broadened.

It will also be noted (FIG. 5) that the outer washer 6 is locked axially by means of a rectangular cut-out 98, which the welded lugs 95 have at their outer periphery.

In FIG. 4 the washer 6 is locked axially in a single direction by means of a shoulder 99.

In some cases, the elastic means 7 effect such a locking by themselves alone because the lugs 65 come into engagement, through their fingers 66, with the springs 72, 73, themselves in engagement with the lugs 95 and 55.

In FIG. 2 the mass 3 is pivotally mounted on the tubular nose 17 fixed to the housing 12 by means of a smooth bearing 41 with a low coefficient of friction.

It will be noted that a sealing joint is provided between the inner periphery of the mass 3 and the outer periphery of the bearing 41 in this case fixed to the nose 17.

A friction washer 44 is interposed axially between the wall 28 of the housing 12 and the mass 3, whilst a friction washer 45 acts on the other face of the mass 3.

This washer is held by an application washer 43 locked axially by a circlip 42 mounted in a groove, which the nose 17 has at its free end.

As a variant the washer 43 is attached by screwing to the free end of the nose 17. In all cases the mass 3 is locked axially in one direction by a shoulder formed by circlip 42 fixed axially to the nose 17, and the nose 17 is located radially below the annulus 25 and device 16.

According to another characteristic a variable hysteresis device 80 acts between the front wall 28 of the housing 12 and the mass 3.

This device includes an axially acting elastic washer 83 of the Belleville washer type (or a crinkle washer as a variant) and an application washer 84 bearing on its face directed towards the wall 28 a friction lining in this case fixed by bonding to the washer 84.

Naturally the friction washer can be bonded against the wall 28.

The washers 83, 84 are mounted in hollow 81 which the mass 3 has for this purpose.

As can be seen in FIG. 2, the washer 83 bears between the bottom of the hollow 81 to act on the washer 84 and force the said washer 84 in the direction of the face 28 in order to grip the friction lining of the washer 84 in contact with the wall 28.

Thus the mass 3 is pivotally mounted at its inner periphery on the housing 12 by means of an annular bearing 41, 44, 45 in a U shape overall.

The piston 2 delimits, in a manner known per se, two chambers. When the vehicle starts up, the piston 2 is at a distance from the face 32 and mass 3. A hydraulic pressure is then established in the chamber delimited by the piston 2, mass 3 and hub 13.

This chamber is then fed from transverse channels in the ring 18.

The locking clutch 10 is then disengaged and the impeller wheel can then drive the turbine wheel 14 and hub 13 by means of the circulation of the fluid contained in the housing 12.

In order to avoid slip phenomena and energy losses, once the turbine wheel 14 is being driven, the hydraulic pressures in the two control chambers delimited by the piston 2 are reversed.

The piston 2 is then allowed to move up to the lining 40 and then clamp the lining 40.

During this phase, the elastic washer of the hysteresis device 80 is relieved.

It will be noted that here the application washer 84 is locked with respect to rotation by means of a pin 82 located at the level of the hollow 81.

Naturally a circumferential clearance can be provided, the washer 84 acting in a deferred manner.

To this end, the washer 84 bears at its inner periphery at least one axially oriented lug able to come into engagement with the pin 82.

Naturally, as a variant (FIG. 7), the mass 3 can have at least one cut-out 181 in the form of a mortice for the entry, optionally with circumferential clearance, of a lug 182 in the form of a tenon which the application washer 184 has at its inner periphery.

The Belleville washer 183 is then interposed axially between the mass 3 and the application washer 184, being centred by the lug 182.

It will be noted that, in this figure, the washers 44 and 43 have been omitted and that the mass 3 is able to move axially, the shoulder 42 serving to limit the axial movement.

By virtue of all these arrangements, a locking clutch is obtained having, at the level of the hub 13, a very low inertia, principally that of the piston, when it is in the disengaged position, and with a high inertia, due to a great extent to the heavy mass 3, when it is engaged (with the lining 40 gripped between the surface 32 and counter-surface 22).

This high inertia makes it possible to reduce the resonant frequency of the kinematic chain extending from the vehicle engine to the gearbox via the apparatus 11.

This resonant frequency is thus very low. Thus, when the vehicle is travelling, this resonant frequency is significantly exceeded, which is favourable for the comfort of the user.

It will be noted that, when the piston 2 is engaged, in a first phase, the friction due to the hysteresis 80 is great and then diminishes as the lining 40, optionally segmented, is gripped, the hydraulic pressure acting against the force developed by the elastic washer 83, 183. When the clutch is disengaged the friction increases.

Thus, when the vehicle starts off, when passing through the resonant frequency, there is a high level of friction between the housing 12 and washer 84 (the mass 3 then moving with respect to the housing 12) in order better to damp the vibrations, and then this friction diminishes.

It will be noted that the torsion damper 4 also makes it possible to attenuate vibrations, and that the embodiment in FIG. 7 is preferable since the mass 3 is able to move axially.

Naturally it is possible to remove the washer 44 in FIG. 2. In all cases the circlip 42 limits the axial movement of the mass 3 in order to prevent notably a licking of the lining 40 when the clutch 10 is disengaged.

Because of this possibility of movement, in normal running (with clutch 10 engaged), low friction is obtained between the mass 3 and wall 28 since the washer 83, 183 is relieved. The hysteresis device 80 is thus variable.

As will have been understood, the input part of the locking clutch is in two coaxial parts, namely the mass 3 and the housing 12, and the torsion damper 4 has two coaxial parts 12, 3 mounted so as to be able to move angularly with respect to each other within the limits of a given angular movement.

This movement takes place over a wide angle by virtue of the phasing washers 5, 6. The bearing 41 assists such a large movement, as does the location of the elastic means 7 over a large circumference, as mentioned previously.

In this way a high level of comfort is obtained for the user.

Naturally the present invention is not limited to the example embodiment described. In particular the mass 3 can be pivotally mounted on the nose 17 by means of a ball bearing with one or more rows of balls, preferably sealed.

The springs 71, 72, 73 may have only one spring.

As a variant the hydrokinetic coupling apparatus 11 may include a coupling which then has no reactor wheel.

In all cases the housing 12 constitutes here the driving element of the hydrokinetic apparatus and also the input element of the torsion damping device, the mass 3 constituting the output part of the said torsion damper.

The piston 2 constitutes the output element of the locking clutch locked with respect to rotation with axial mobility on the driven element of the hydrokinetic coupling apparatus.

As a variant the piston 3 can be pivotally mounted on the hub 13 whilst being coupled directly to the turbine wheel 14 by tangential tongues.

The hub 13 then has no fluting at its outer periphery.

It will also be appreciated that the response time for engaging and disengaging the clutch 10 are very short because of the low inertia of the piston 2 and because the gear wheels in the gearbox are lightly stressed when the clutch 10 is released because of the low inertia of the piston 2.

Naturally the washer 6 can be centred by the lugs 95.

In all cases the inner phasing washer 5 is mounted so as to pivot freely with respect to the mass 3, whilst the second phasing washer 6 is mounted so as to pivot freely either with respect to the lugs 55 of the washer 5 and therefore with respect to the mass 3, or with respect to the lugs 95 belonging to the second part of the damper 4, the mass 3 belonging to the first part of the damper 4.

As a variant long pre-arched curved springs can be interposed between two consecutive lugs 95, the springs being capable of being actuated by the fingers 85 by means of the dishes 96.

In this case a curved spring replaces the springs 71, 72, 73.

In the preceding figures, the dishes 96 can be provided at each circumferential end of the springs 71, 72, 73.

As a variant, the structures can be reversed. Thus the inner phasing washer 5 can have at its inner periphery lugs directed radially towards the axis of the assembly and the mass 3 the passages.

For example the mass 3 has a complementary groove hollowed in its face 33. This groove is interrupted locally (the front edge of this directed towards the housing 12) for passage of the inner lugs of the washer 5. These lugs then advantageously have in cross section a shape complementary to that of the groove in order to be engaged therein.

Thus the washer 5 can have for example three inner lugs evenly distributed circumferentially and the mass 3 three corresponding cut-outs. The lugs are then engaged axially in the cut-outs and then a rotation and therefore a mounting of the bayonet type is effected.

Thus the centring washer 5 has projections from place to place, whilst the mass 3 has locally passages into which the projections are able to enter, so that the mounting of the inner washer on the mass 3 is of the bayonet type. The groove being for example trapezoidal in shape, as in the previous figures, the first coaxial part (the mass 3) therefore has at its outer periphery a first bearing face opposite another bearing face cut out for the lugs of the inner washer to pass, so that a groove, in this case trapezoidal, is formed for the housing of the inner washer, locked axially and radially by its inner lugs, trapezoidal in cross section, complementary to that of the groove.

Naturally the groove can be rectangular in cross section, just like the complementary lugs.

Finally, the parts 33, 23 for connecting respectively the projection 31 to the main part of the mass 3 and the counter-surface 22 to the main part of the piston 2 can be curved in shape in order best to fit the shape of the turbine wheel 14.

We claim:

1. Hydrokinetic coupling apparatus, having a housing (12) capable of being rotatably locked to a driving shaft, a turbine wheel (14) capable of being rotatably locked to a driven shaft and a locking clutch (10) acting between the housing (12), having a wall (28) which is transverse overall and which carries centrally a tubular nose (17), and at its outer periphery an axially oriented annular (19), and the turbine wheel (14), the clutch including a piston (2) mounted so as to be axially mobile with respect to the turbine wheel (14) whilst being rotatably locked to the latter, and a counter-piston (3) associated with the housing (12), in which the piston (2) is interposed axially between the turbine wheel (14) and a mass (3), forming the counter-piston, rotatably mounted on the housing (12), and coupled elastically to the housing (12), and in which the mass (3) is pivotally mounted on the tubular nose (17), fixed to the housing (12), and forms the output element of a torsion damping device (4) including elastic means (7) with circumferential action and an input element consisting of the housing (12), characterized in that a bearing (41) is interposed radially between the inner periphery of the mass (3) and the outer periphery of the nose (17), in that the mass (3) has a main part (30) and, at the outer periphery of its main part (30), a transversely oriented annular projection (31) directed radially in the direction of the annular rim (19) on the housing, being offset axially with respect to the main part (30) of the mass (3) in the direction of the outer periphery of the turbine wheel (14), in that the projection (31) offers a contact surface (32) for the piston (2) and in that the circumferential-action elastic means (7) of the torsion damping device are mounted at the outer periphery of the main part (30) of the mass (3) between the transverse projection (31) on the mass (3) and the transverse part (28) of the housing (12).

2. Apparatus according to claim 1, characterized in that the mass (3) is locked axially by a shoulder (42) axially fixed to the nose (17) on the housing (12).

3. Apparatus according to claim 2, characterized in that the mass (3) is locked axially by a circlip (42) mounted in a groove which the nose (17) has at its free end.

4. Apparatus according to claim 1, in which a variable hysteresis device (80) with an axial-action elastic washer (83) is interposed axially between the mass (3) and the front wall (28) of the housing (12), characterized in that the mass (3) is mounted on its associated bearing (41) with an axial clearance with respect to the shoulder (42) of the nose (17).

5. Apparatus according to claim 1, characterized in that the annular projection (31) is connected to the main part of the mass (3) by an inclined part (33).

6. Apparatus according to claim 1, in which the elastic means (7) includes springs (7), characterized in that the projection (31) on the mass (3) carries a plurality of fingers (85), of axial orientation, directed towards the transverse wall (28) of the housing (12) to act on the springs (7), whilst the transverse wall of the housing (12) carries bearing lugs (95) directed axially towards the projection (31) on the mass (3) to support the springs (7).

7. Apparatus according to claim 6, characterized in that the fingers (85) each enter into a circumferential cut-out (97) on the bearing lugs (95).

8. Apparatus according to claim 7, characterized in that the fingers (85) have an oblong shape.

9. Apparatus according to claim 8, characterized in that the fingers (85) bear on dishes (95) curved centrally to engage the fingers (85) and in that the bearing lugs (94) are profiled so as to hold the dishes ( 96 ).

10. Apparatus according to claim 9, characterized in that the torsion damper (4) includes two phasing washers (5, 6) with radial arms (55, 65), mounted in the same plane, in reverse orientations and concentrically.

* * * * *